United States Patent [19]
Bicknese et al.

[11] Patent Number: 5,563,749
[45] Date of Patent: Oct. 8, 1996

[54] DIRECT ACCESS STORAGE DEVICE WITH OPPOSING ACTUATOR AND SPINDLE FLANGES TO REDUCE DISK-TO-DISK SPACING

[75] Inventors: Bryan W. Bicknese, Rochester; Jeffrey F. Boigenzahn, Pine Island; Randy J. Bornhorst, Rochester; Jerome T. Coffey, Rochester; Todd P. Fracek, Rochester; Douglas W. Johnson, Rochester; Richard E. Lagergren, Rochester; James M. Rigotti, Rochester; Marvin A. Schlimmer, Rochester, all of Minn.

[73] Assignee: International Business Machines Corporation, Armonk, N.Y.

[21] Appl. No.: 347,542

[22] Filed: Nov. 30, 1994

[51] Int. Cl.$^6$ .......................... G11B 5/012; G11B 17/08
[52] U.S. Cl. .................... 360/97.01; 360/98.08; 360/99.12
[58] Field of Search .............. 360/97.01, 98.08, 360/99.12, 98.01, 106

[56] References Cited

U.S. PATENT DOCUMENTS

| | | | |
|---|---|---|---|
| 5,014,142 | 5/1991 | Nakanishi | 360/106 |
| 5,189,577 | 2/1993 | Nishida et al. | 360/106 |
| 5,223,993 | 6/1993 | Squires | 360/106 |
| 5,227,936 | 7/1993 | Strickler et al. | 360/97.02 |
| 5,291,357 | 3/1994 | Uda | 360/99.08 |

*Primary Examiner*—A. J. Heinz
*Attorney, Agent, or Firm*—Laurence R. Letson; Roy W. Truelson; Matthew J. Bussan

[57] ABSTRACT

A disk drive or direct access storage device (DASD) of the type having multiple disks and multiple actuator arms, both the disks and the actuator arms assembled in a stacked manner, advantageously assembled with the locating surface or flange of the actuator disposed on the opposite side of the stacked actuator arms from the side of the disk stack having the locating surface or flange for the disk hub. This opposite flange design results in a substantial reduction in the effects of tolerance buildup and therefore permits the design of the disk drive equal in all other respects to a conventional same side flange arrangement, but permitting additional disks, lower height, less tightly defined tolerances on components or the use of cheaper manufacturing techniques and technologies for recording data.

8 Claims, 2 Drawing Sheets

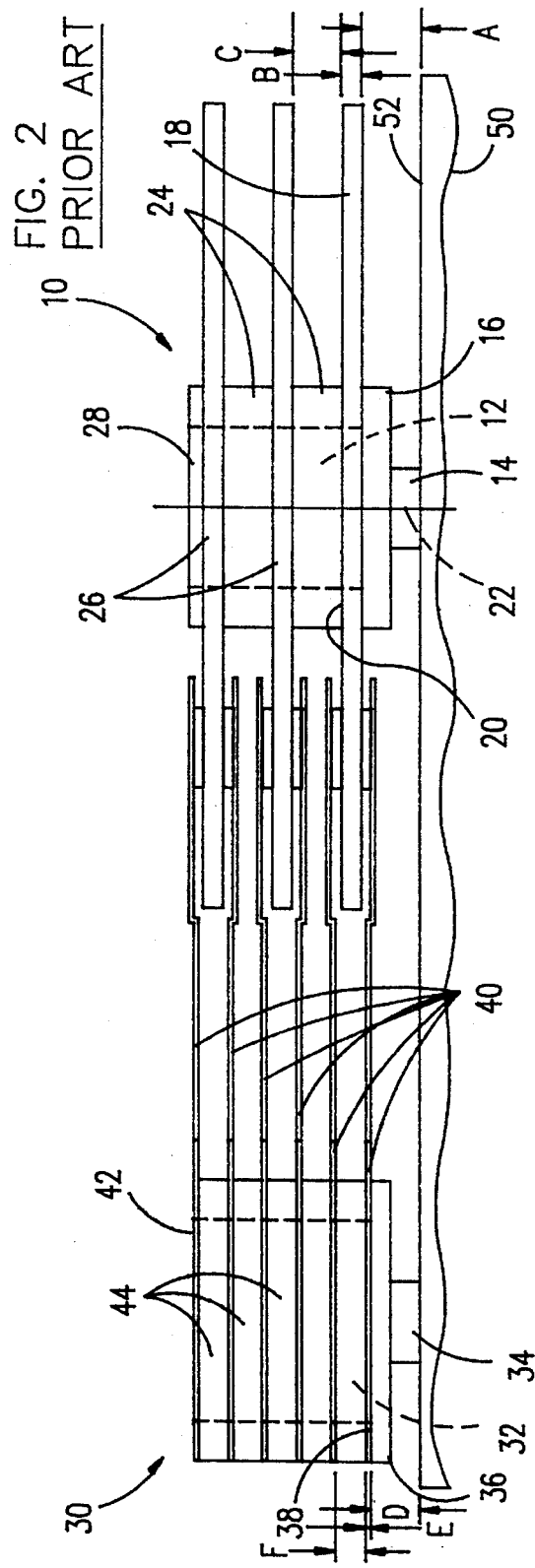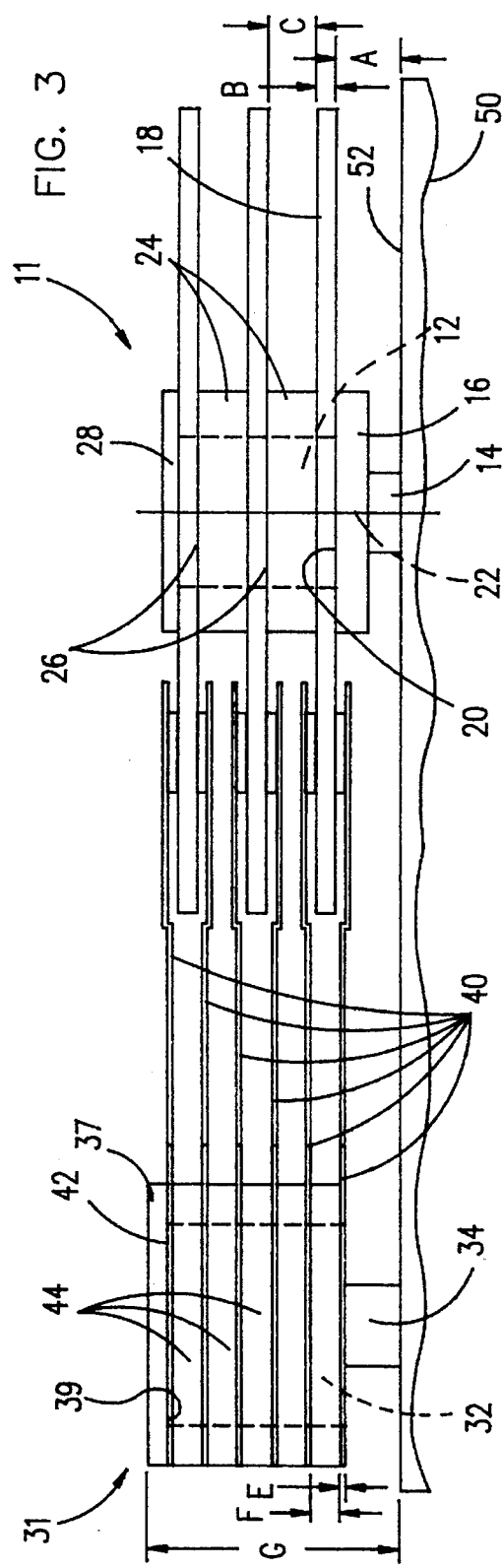

5,563,749

DIRECT ACCESS STORAGE DEVICE WITH OPPOSING ACTUATOR AND SPINDLE FLANGES TO REDUCE DISK-TO-DISK SPACING

FIELD OF THE INVENTION

This invention relates to Direct Access Storage Devices (DASD) and specifically to the assembly of the disk pack and the actuators in the disk drives.

BACKGROUND OF THE INVENTION

Direct Access Storage Devices (DASD) or disk drives have been assembled with two types of actuators; the stacked type actuator whereby each arm and its associated structure are stacked onto a spindle and shaft with appropriate spacers disposed between adjacent actuator arms in order to provide spacing of the arms for engagement with associated disk surfaces, and the comb type actuator where the actuator is either machined or molded with the actuator comb being single piece with a plurality of members extending therefrom to act as attachment points for the actuator load beams. The comb type is more difficult to manufacture because of the complexity of assembling the load beams, sliders and associated wiring to a fixed structure of the comb. Two types of actuator supports exist; a live or rotational shaft to which the actuator arms and spacers of a stacked actuator are fixed, and a dead or fixed shaft upon which a hub rotates, through a bearing set. The hub of the dead shaft stacked actuator carries the actuator arms and spacers. Some live shaft actuators have hubs also which carry the actuator arms and shafts.

The prior art DASDs have had flanged hubs which are placed with the flanges accurately positioned relative each other and/or relative to a known datum plane. The hubs are axially parallel and spindle shafts support the hubs and the flanges. The flanges, one for the stacked actuator and one for the stacked disk pack, comprise locating surfaces upon which the actuator assembly and the disk pack are assembled.

The prior art of which U.S. patents U.S. Pat. No. 5,189,577 issued to Nishida et al., U.S. Pat. No. 5,227,936 issued to Strickler et al. and U.S. Pat. No. 5,291,357 issued to Uda are exemplary, forms stacked actuators and stacked disk packs by placing actuator arms and spacers over the actuator hub and by placing the disks and the spacers over the disk hub, where the locating surfaces or locating flanges of the respecting spindles are disposed such that they are between the actuator arms or the disks and the base or frame of the disk drive. FIG. 1 is a schematic representation of a live shaft actuator disk drive having actuator arms and spacers disposed between the locating flange and the base or datum plane. FIG. 2 is a schematic representation of the stacked type disk drive assembly found in Nishida et al, Strickler et al, or Uda.

As is well known in the industry, each arm, spacer or disk is designed with a nominal height or thickness dimension and a stated or specified tolerance. One of skill in the art will appreciate that as the spacers and the actuator arms or disks are stacked on their respective hubs, cumulative tolerance buildup occurs. As the buildup of the tolerances occurs, the clearance between the actuator arm and the adjacent disk surface must be designed to be sufficient to accommodate any worst case tolerance buildup condition in order to prevent the actuator arm from rubbing against the disk surface which thereby would damage the disk surface and render the disk ineffective for recording of digital data.

As disk drives are reduced in size to fit into laptop and notebook sized computers, the vertical dimension of the disk drive assembly continues to be very tightly constrained by standards such as the PCMCIA standard. As the vertical dimension is so tightly constrained, any addition of a few thousandths of an inch to each actuator arm/disk clearance which are not required consumes scarce and valuable height. Furthermore, designs such as illustrated in FIG. 1. become impractical because the live shaft design of that type DASD require the jaw shaped shaft support necessary to support both ends of the rotatable live shaft 114. The portion 138 above the moveable actuator, having a bearing mounted therein, cannot be accommodated in a low profile DASD such as a PCMCIA standard DASD due to the height constraints imposed by the PCMCIA standards.

While tolerances may be defined more tightly to alleviate some of these clearance problems, wherever possible, the cost of manufacture greatly increases with such tightening of the tolerances to the point that the dimensional gain is offset by the manufacturing cost increase and therefore becomes impractical.

SUMMARY OF THE INVENTION

It is an object of the invention to partially eliminate excessive actuator arm/disk surface clearances.

It is another object of the invention to reduce the height of the disk stack and the height of the actuator stack without reducing the tolerances associated with the spacer thickness dimensions in the disk drive.

An additional object of the invention is to reduce the clearance dimension between the actuator arm and the disk surface.

The disadvantages of the prior art structural techniques are overcome and the objects of the invention accomplished by designing the dead shaft actuator hub with the locating flange or locating surface disposed at the end of the hub most remote from the datum plane and the locating flange of the disk pack located on the end of the disk hub located most closely to the datum plane. The position of the locating flanges may be reversed, if so desired, by positioning the disk pack locating surface at a position most remote from the datum plane and the locating surface on the actuator spindle closest to the datum plane.

The essential consideration in the design is that the assembly of the actuator stack and the disk pack stack and hence the tolerance buildup for the disk pack and the actuator progresses in opposed directions relative to the datum plane for mounting onto dead shafts or dead spindles for each.

Buildup of tolerances as the actuator and the disk pack are assembled therefore will occur in opposite directions and to some extent will offset each other, permitting a reduced clearance as dictated by the disk-to-disk spacing.

With a reduced clearance dimension necessary to accommodate new design constraints, the volumetric density of the disk drive is altered permitting either the introduction of more disks in a given form factor, if desired, or a relaxation of tolerancing requirements with consequential cost savings.

The benefit from the addition of a disk is that lower performance recording technologies then may be used in the disk drive or DASD, affording a greatly reduced cost while achieving the same overall recording capacity. Should the state of the art recording technique be used, a disk drive with a higher overall recording capacity results. In either case, substantial benefits flow from the invention whether they be increased recording capacity or by use of a lower performance recording technology, a reduced cost device.

A more detailed understanding of the invention and the basis therefore may be acquired from the attached drawings and the detailed description of the invention to follow.

DRAWINGS

FIG. 2 is a depiction of a prior art dead shaft disk drive with a stacked actuator and a stacked disk pack whereby the locating surface of the actuator is disposed between the actuator arms and the datum plane of the DASD.

FIG. 3 is a depiction of a disk drive with a dead shaft actuator and a dead shaft disk pack according to the subject invention.

DETAILED DESCRIPTION OF THE BEST MODE OF THE PREFERRED EMBODIMENT OF THE INVENTION

Figure 1:
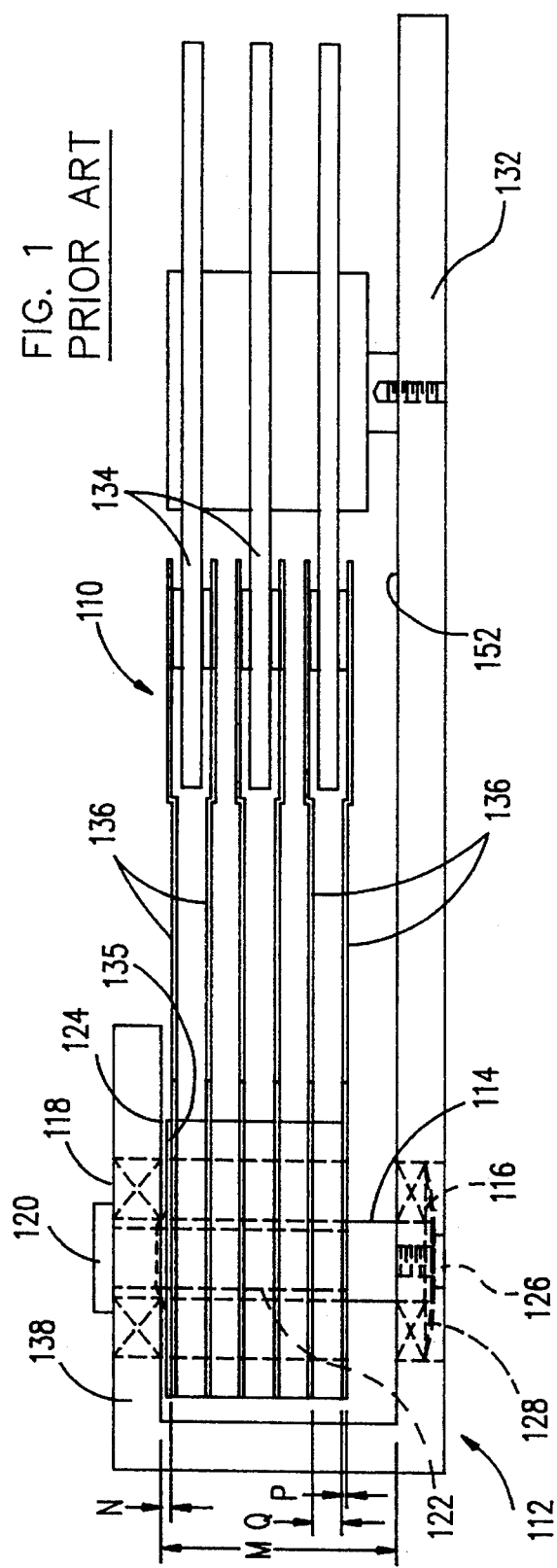
FIG. 1 is an illustration of a prior art live shaft actuator in a disk drive whereby the actuator arms and spacers are disposed on the actuator shaft between the locating surface and the datum plane of the DASD.

Referring initially to FIG. 1. prior art DASD 110 has a live shaft actuator 112 which has a live shaft 114 journaled in bearings 116, 118. Live shaft 114 has a head 120 which seats against the inner race of bearing 118. Shaft 114 extends through hub 122 and hub flange 124 and is retained within bearing 116 by a retaining screw 126 and suitable biasing springs 128, such as one or more belville washers. The biasing springs 128 act against floating bearing 116 to force the inner race of the bearing 116 up against an end surface of the actuator hub 122. It will be understood that no axial location control exists for the actuator 112 from the bearing 116 or the base of the DASD 110.

Actuator location control is based on placement of the bearing 118 relative to the datum plane 152, typically a surface on the base casting 132. Because of the basis of the location control in the bearing 118, the tolerances effecting the relationship between the disks 134 and the actuator arms 136 is affected by the dimensions M and N and their associated tolerances. M is the dimension from the datum plane 152 to the bottom of the bearing 118 inner race and N is the dimension from the engaging end surface of hub 122 and the locating flange surface 135.

Probably more important to the disk drive designer designing low height drives, the frame top support 138 consumes much too much height to be a viable design for thin PCMCIA standard disk drives. Whenever this frame top support 138 is eliminated, part of the support from live shaft 114 is eliminated thus rendering the live shaft design unusable in that environment and the top flange arrangement impractical because of the lack of locating control on the top of the flange 124.

The dimensions of the actuator arm thickness P and spacer thickness Q have associated therewith tolerances and analogous to dimensions E and F, discussed below with regard to FIGS. 2 and 3.

Referring now to FIG. 2, which illustrates a second prior art disk drive assembly, a disk pack 10 is disposed on hub 12. Hub 12 is further disposed on a shaft 14. Shaft 14 may be the stationary shaft of the electrical motor (not shown) which rotates the hub 12 or a live shaft driven by a flat motor located on the base plate 50. The drive motor (not shown) typically is disposed within the hub 12 and surrounding shaft 14. Hub 12 is provided with a flange 16 against which disk 18 is positioned. Flange 16 has a locating surface 20 against which disk 18 is positioned. Disk 18 fits down over hub 12 and relies upon surface 20 for positioning with respect to datum plane 52. After the positioning of disk 18 on surface 20 and surrounding hub 12, spacers 24 and disks 26 are alternately installed to complete the disk pack. The disk pack may have any desired number of disks 18, 26. The top-most disk 26 then is retained by retainer 28 to insure that the disks 18, 26 and spacers 24 are rigidly attached to hub 12, thus forming a disk pack. The actuator 30 is similarly built up on actuator hub 32 which is pivotally or rotationally mounted for movement relative to actuator shaft 34. Hub 32 is provided with a flange 36 having a locating surface 38 thereon.

Actuators arms 40 are then assembled onto hub 32. Each actuator arm 40 is provided with a plurality of mounting rings 42, only one of which is reference numbered for clarity, which fit down over hub 32. Spacers 44 are interposed between each of the actuator arms 40 and particularly between each of the mounting rings 42. After assembly, the actuator arm mounting rings 42 and spacers 44 are clamped to the hub 32 by any conventional means, not shown. The resulting assembly may be referred to as an actuator pack.

Surface 20 on hub 12 and surface 38 on actuator hub 32 are positioned relative to each other in a precisely controlled manner, generally with reference to a datum plane such as 52. The surfaces 20 and 38 may be specified as displaced by specified amounts from the base plate 50 to which are attached shafts 14 and 34. The top surface of the base plate 50 designated 52 may act as the datum plane from which the position of the locating surfaces 20, 38 are specified.

Dimension A represents the dimension of displacement of the locating surface 20 relative to the datum plane 52 while dimensions B and C are the nominal thicknesses of disks 18, 26 and spacer rings 24, respectively.

Similarly, dimension D is the distance that the locating surface 38 of the actuator spindle is displaced from the datum plane 52 while dimensions E and F are the nominal thicknesses of the individual actuator arm mounting ring 42 and the individual spacer 44 for the actuator 30. For purposes of this disclosure and discussion, the thicknesses of all disks are equal, the thicknesses of all disk pack spaces 24 are specified as equal, the thickness of actuator arm mounting rings 42 are all specified equal, and the thicknesses of all spacers 44 for the actuator 30 are equal. Similarly, each of the tolerances associated with each dimension B, C, E and F is similarly specified to be equal.

Now referring to FIG. 3, the construction of the disk pack 10 in FIG. 3 is identical to that in FIG. 2 and, therefore, will not be further described.

The individual components of the actuator 31 in FIG. 3 are identical with the exception that hub 32 is provided with flange 37 having a locating surface 39 thereon. It should be noted that flange 37 and locating surface 39 are disposed such that the stack of actuator arms 40 and spacers 44 are disposed between flange 37 and base plate 50.

Similarly the distance from base plate 50 or datum plane 52 and the locating surface 39 of flange 37 has been designated by the letter G to prevent confusion. In all other respects, the dimensional descriptions for dimension A, B, C, E and F described with respect to FIG. 1 also apply to FIG. 3.

Each of the dimensions A, B, C, D, E, F and G in FIGS. 2 and 3 will have a tolerance associated with it. As with the dimensions in FIG. 2, the dimensions in FIG. 3 will have a consistent tolerance associated with each of the similarly designated components.

As can be seen first with respect to FIG. 2 as the disks 18, 26 and spacers 24 are assembled, the tolerances will accumulate such that in a worst case condition, all of the tolerances will be at the maximum and will have the same sign. Similarly, the tolerances associated with dimensions D, E, and F will accumulate as the actuator 30 is assembled. In the worst case condition again, all the tolerances will be the maximum allowed and will have the same sign but the sign will be the opposite of the sign of the tolerance associated with dimensions A, B, and C. Thus, it can be seen that the maximum effect of the accumulated tolerances on each of the two assemblies, the actuator 30 and the disk pack 10, will occur at the top actuator arm 42 with respect to the top disk 26. Accordingly, the spacer dimensions must be designed in each column to accommodate the maximum possible tolerance variation and still provide clearance between each actuator arm 40 and its respective surface of disk 26.

The clearance required for the disk drive assembly 110 of FIG. 1 may be mathematically expressed in the following equation.

$$CLR \text{ (top disk/top arm)} = d + 5e + 5f + (a + 3b + 2c) \quad [EQ.1]$$

Where:
- a = the tolerance associated with dimension A (the distance from the datum plane 52 to the flange locating surface 20);
- b = the tolerance associated with the disk 18, 26 thickness B;
- c = the tolerance associated with the thickness of the disk spacer 24 dimension C;
- d = the tolerance associated with the dimension D from the datum plane 52 to the flange locating surface 38;
- e = the tolerance associated with the actuator arm 40 thickness, dimension E;
- f = the tolerance associated with the actuator spacer 44 thickness dimension F.

As can be seen from analysis of EQ.1, the clearance for the worst case condition is the sum of the tolerance values for dimensions D plus the cumulative tolerances of five actuator arm thicknesses E, the cumulative tolerances of five spacer thicknesses F plus the cumulative sum of the tolerances of dimension A plus three tolerances for dimension B of the disk thickness and three of the tolerances of spacer thickness dimension C associated with the disk pack.

The analogous equation for analysis of clearance between the top disk and the top arm of the disk drive assembly illustrated in FIG. 3 is:

$$CLR \text{ (top disk/top arm)} = g + e + (a + 3b + 2c) \quad [EQ.2]$$

Where:
- g = the tolerance associated with the dimensional distance G between the datum plane 52 and the locating surface 39 of actuator flange 37;
- e = the tolerance associated with the actuator arm 40 thickness dimension E;
- a = the tolerance associated with dimension A (the distance from the datum plane 52 to the flange locating surface 20);
- b = the tolerance associated with the disk 18, 26 thickness B;
- c = the tolerance associated with the thickness of the disk spacer 24 dimension C.

One will appreciate from an analysis of EQ.2, that the worst case condition may exist between the topmost actuator arm 40 and the topmost disk 26.

It should be understood that these equations represent the analysis necessary for a disk pack with three disk and a six-arm actuator. This particular configuration was only chosen for purposes of illustration and it should not be considered limiting in any way with regard to the application of the equation. It will be understood that as the number of disks and the number of arms on the actuator increase, the numerical co-efficients in both Eq.1 and Eq.2 will increase correspondingly.

Should one wish to conduct the tolerance analysis to determine the appropriate clearance in a statistical manner rather than in an algebraic manner, the equation for the statistical analysis of tolerance build-up and to determine the standard deviation of the clearance between the topmost arm and the topmost disk of the disk drive, illustrated in FIG. 1, utilizes the following equation:

$$S(clr)^2 = (Sd)^2 + 5(Se)^2 + 5(Sf)^2 + (Sa)^2 + 3(Sb)^2 + 2(Sc)^2 = 17S^2 \quad [EQ.3]$$

Where: S = the standard deviation of the clearance
Where Sa = the standard deviation of the tolerance associated with dimension A;
Sb = the standard deviation for the tolerance associated with dimension B;
Sc = the standard deviation of the tolerance associated with dimension C;
Sd = the standard deviation of the tolerance associated with dimension D;
Se = the standard deviation of the tolerance associated with dimension E;
Sf = the standard deviation of the tolerance associated with dimension F.

Once determined, the standard deviation may then be used in a conventional manner to determine the clearance which is necessary to insure that interference will not occur between the topmost disk 26 and the topmost actuator arm 40 as illustrated in FIG. 2.

Similarly, the statistically oriented equation for the disk drive 11 illustrated in FIG. 3, referred to as the opposite flange assembly, for the top surface of the top disk 26 is:

$$S(clr)^2 = (Sg)^2 + (Se)^2 (Sa)^2 + 3(Sb)^2 + 2(Sc)^2 = 8S^2 \quad [EQ.4]$$

Where:
S = the standard deviation of the clearance;
Sg = the standard deviation of the tolerance associated with dimension G;
Se = the standard deviation of the tolerance associated with dimension E;
Sa = the standard deviation of the tolerance associated with dimension A;
Sb = the standard deviation for the tolerance associated with dimension B;
Sc = the standard deviation of the tolerance associated with dimension C;

The tolerance equation for the bottom surface of the bottom disk 18 of the opposite flange design of FIG. 3 is:

$$S(clr)^2 = (Sg)^2 + 5(Se)^2 + 5(Sf)^2 + (Sa)^2 = 12S^2 \qquad [\text{EQ.5}]$$

Where:
- S=the standard deviation of the clearance;
- Sg=the standard deviation of the tolerance associated with dimension G;
- Sa=the standard deviation of the tolerance associated with dimension A;
- Se=the standard deviation of the tolerance associated with dimension E;
- Sf=the standard deviation of the tolerance associated with dimension F.

Equation 5 is the equation to determine the standard deviation of the clearance for the bottom disk surface of disk 18 in the opposite flange system in FIG. 3.

As can be seen by comparing the results of EQ.3 and EQ.5, representing respectively the top surface clearance for the conventional flange system of FIG. 1 and the clearance for the bottom surface of the disks in the opposite flange system of FIG. 2, a resultant approximate 16% reduction in tolerance buildup will be found for a three disk, six actuator arm disk drive.

This 16% of the tolerance buildup which may be eliminated or which is not required in the opposite flange system, illustrated in FIG. 3, may very advantageously be used in PCMCIA type III disk drives having a maximum 10.5 mm vertical height limit to actually spread out the actuator arms 40 on the actuator 31 and the disks 18, 26 on the disk pack hub 12 to occupy all of the available space thereby increasing the amount of permissible deflection of the various components of the disk drive 10. Such spreading reduces the possibility of any damage due to mishandling of the disk drive 10.

Alternatively, since the parts are extremely tightly toleranced, which results in higher manufacturing costs to achieve less tolerance buildup, it is now possible to relax these tolerances and thereby utilize the available volume within the disk drive, with this invention. With relaxed tolerances, the parts for the disk drive may be manufactured more cheaply, rendering the disk drive equal in performance with the conventional flange arrangement of FIG. 1.

Figure 4:
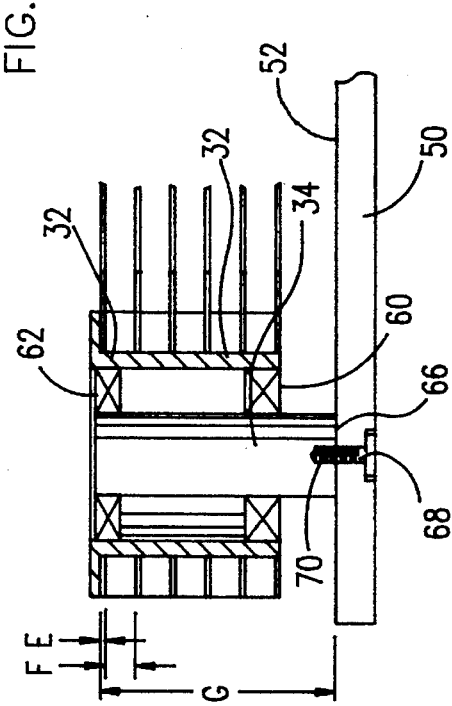
FIG. 4 is a more detailed illustration of the actuator hub and actuator design of the dead shaft actuator of FIG. 3.

The structure illustrated in FIG. 4 is an approach to an opposite flange arrangement which permits the opposite flange design in a dead shaft design.

The actuator hub 32 is provided with bearings 60, 62. At least bearing 62 is fixed to the interior of hub 32 by bonding the outer race to the hub 32 interior. Bearing 60, if desired, may also be bonded to hub 32 but such bonding is not required. Shaft 34 then may be inserted into the bearing 60 and the shaft 34 is bonded to the inner race of bearing 62.

The bonding is preferably an adhesive bonding for very compact and small disk drives inasmuch as press fitting requires substantial structural strength in the bearing 62 and in the hub 32. Such structural strength may not exist in such small parts. However, if the disk drive size is sufficient, press fitting of the parts is acceptable.

After the bonding or fixing operations described above, the hub 32, shaft 34, and bearings 60, 62 may be fixtured and the bearings preloaded. Thereafter, the end surface 66 of shaft 34 is ground to establish dimension G. By fixturing against flange locating surface 39 and applying the bearing preload, the cumulative dimensions involving bearing placement, shaft length, hub flange thickness, and hub length are consolidated into a single dimension G with a single associated tolerance.

This design approach permits the use of the opposite flange approach to controlling tolerance buildup in a dead shaft design and the use of dead shaft 34, which is attached to base plate 50 by a screw 68 extending through base plate 50 and into a threaded base 70.

The shaft 14 shown in FIG. 3 may be similarly attached to the base plate 50. The base plate 50 is typically ground to provide datum plane locating surfaces such as the datum plane/top surface 52 of base plate 50.

From the foregoing, it is readily apparent to one of skill in the art that there is a significant advantage to be derived from the design of a disk drive where the flange or locating surface on the actuator is disposed such that the actuator arms are between the locating surface and the datum plane while the locating surface on the flange of the disk pack spindle is disposed between the disk pack disks and the datum plane.

The same benefit may be derived from reversing the flange arrangement wherein the actuator 30 may be as in FIG. 2 with the disks 18, 26 being disposed between the locating flange 16 of hub 12 and the datum plane 52.

Accordingly, one will understand that minor modifications and changes may be made by one of skill in the art without removing the disk drive devices from the scope of the claims which are attached.

We claim:

1. A direct access storage device (DASD) comprising:

a base plate for supporting components of said direct access storage device;

a first shaft for supporting a first hub for rotation relative to said first shaft, said first shaft fixedly disposed relative to said base plate;

said first hub comprising a flange defining a first datum reference extending radially relative to said first shaft and disposed at a fixed distance from said base plate;

a plurality of data storage disks and disk spacers supported by said first hub and positioned with reference to said first datum reference for rotation about said first shaft;

a second shaft for supporting a second hub for rotation, said second shaft fixedly disposed relative to said base plate;

said second hub comprising a flange defining a second datum reference extending radially relative to said second shaft and disposed at a fixed distance from said base plate;

a plurality of actuator arms and a plurality of actuator arm spacers supported by said second hub and positioned with reference to said second datum reference for rotation about said second shaft and for movement relative to said first shaft, said first hub and said plurality of storage disks;

said flanges disposed on opposite axial ends of said respective data storage disks and said disk spacers and said actuator arms and actuator arm spacers, whereby accumulated tolerances from said data storage disks and disk spacers and from said actuator arms and actuator arm spacers are partially offset thereby reducing clearances that must be designed into said direct access storage device.

2. The DASD of claim 1 wherein one of said plurality of said disks is engaged with said flange on said first hub.

3. The DASD of claim 2 wherein one of said plurality of said actuator arms is engaged with said flange on said second hub.

4. The DASD of claim 3 wherein said base plate forms a datum plane with respect to which said flanges of said first and said second hubs are located.

5. The DASD of claim 3 wherein said second hub is supported by a pair of ball bearings, having inner and outer races, for rotation relative to said second shaft, said second shaft bonded to said one of said races of one of said ball bearings and said other race of said one of said ball bearings bonded to said hub.

6. The DASD of claim 5 wherein at least one of said races of said other of said ball bearings bonded to said second shaft or said second hub.

7. The method of assembling a direct access storage device comprising the steps of:

providing a base plate for supporting a first fixed shaft and a second fixed shaft attached thereto:

providing a first hub comprising a locating flange forming a first datum reference and a plurality of data storage disks and disk spacers disposed on said first hub relative to said first datum reference;

assembling said first hub, said data storage disks and said disk spacers into a disk pack;

disposing said disk pack surrounding said first fixed shaft for rotation thereabout with said flange thereon closely proximate said base plate with said flange disposed between said disk pack and said base plate;

providing a second hub comprising a locating flange forming a second datum reference and a plurality of actuator arms and actuator spacers disposed on said second hub relative to said second reference;

assembling said second hub, said actuator arms and said spacers into an actuator pack;

disposing said second hub surrounding said second fixed shaft for rotation thereabout with said flange thereon spaced apart from said base plate sufficiently to accommodate said actuator arms and said actuator spacers between said flange of said second hub and said base plate;

rigidly attaching at least said second shaft to said base plate after assembly of said actuator pack with said shaft.

8. The method of claim 7 further comprising the steps of:

providing a pair of ball bearings and disposing said pair of bearings between said second shaft and said second hub;

preloading said ball bearings, and bonding at least one of said ball bearings to said second shaft and said second hub to accurately position said second hub and said flange thereon, together with said actuator arms and said actuator spacers with respect to said base plate.

* * * * *